3,025,216
BACITRACIN COMPOSITIONS AND PRODUCTION THEREOF

Jack Ziffer and Thomas J. Cairney, Milwaukee, Wis., assignors to Pabst Brewing Company, Chicago, Ill., a corporation of Delaware
No Drawing. Filed Dec. 8, 1959, Ser. No. 858,024
12 Claims. (Cl. 167—53.1)

This invention relates to new bacitracin compositions which are highly stable. The compositions are especially useful in animal husbandry, and particularly, as feed additives.

The value of bacitracin in animal nutrition and animal therapy is well known, as are products for such uses and the manner of application. Bacitracin is preferably incorporated in the feedstuff in a proportion of about 1 gram to 200 grams per ton of feedstuff. Lower proportions on the order of about 10 to 20 grams per ton have been found to be adequate for nutritional purposes, and the higher levels may be employed for therapeutic purposes.

Bacitracin compositions, however, like other similar antibiotic products, gradually lose antibiotic potency on extended storage, especially under unfavorable conditions of high temperature and high humidity. Thus, U.S. Patent 2,809,892 has for its object the provision of a more stable bacitracin composition, by adding a soluble zinc salt to bacitracin, and subsequently precipitating the insoluble zinc bacitracin salt at an elevated pH.

An object of the present invention is to provide a bacitracin composition of enhanced stability, and particularly, which is resistant to normally adverse conditions of humidity and temperature.

An additional object is to provide such stable bacitracin compositions which are fully active and in which the antibiotic is readily available.

A further object is to prepare stable bacitracin compositions directly from fermentation liquors or from the products recovered from the liquors, in a simple, economical and reliable manner.

Other objects include the provision of animal feed additives and feedstuffs containing the antibiotic bacitracin in a composition of enhanced stability. These and other objects and advantages of the invention will be apparent upon reference to the specification.

It has now been discovered in accordance with the invention that compositions of bacitracin admixed with certain metal compounds are characterized by enhanced stability. The stabilized compositions are produced by simply mixing the compounds with bacitracin, which is preferably in aqueous solution but also may be present in a dry product. It is preferred to mix with an aqueous solution of bacitracin, since this has been found to result in the highest stability. The compositions may be employed in the form in which they are produced, or they may be incorporated with appropriate diluents.

Employing the new stabilized bacitracin compositions, the antibiotic may be controllably administered to livestock with the assurance that the compositions continue to possess the same degree of potency as they originally had. The several preparations containing the antibiotic can be stored under normal conditions and for extended periods of time without substantial change in active content.

It has been discovered in the invention that several water-insoluble metal compounds enhance bacitracin stability when in admixture therewith. Compounds of zinc and cadmium were found to produce the most stable products, and they constitute the preferred class. Zinc compounds are further preferred as having the most widespread utility. Compounds of molybdenum also increase the stability of bacitracin, but substantially less than the zinc and cadmium compounds, so that there would appear to be no substantial advantages in their use.

The preferred compounds are the oxides of the metals, which include the equivalent hydrated forms or hydroxides. Other water-insoluble compounds which are pharmacologically acceptable and are substantially inert except for their property of enhancing stability, such as the carbonates and other inorganic and organic compounds, are contemplated. The term "insoluble" is employed herein in its usual sense, to mean that a negligible quantity of the compound dissolves, and particularly, the solubility is less than about 0.1% by weight in water at 20° C.

It is an advantage of the invention that bacitracin compositions highly stable to temperature and humidity may be prepared simply by mixing the metal compound. In the preferred method of producing the new composition, by mixing the metal compound with an aqueous solution of bacitracin, it is preferred to provide a pH in the range of about 2.5 to 8 in the resulting mixture. The stability of the bacitracin in the mixture falls off in the vicinity of pH 3.5, and while at a lower value the stability is still considerably greater than for bacitracin alone, it is preferred for maximum stability that the pH be at least about 3.5 and further preferably, about 4.5 to 6.5. The pH of the mixture and the desirability of pH adjustment will depend upon the pH of the bacitracin solution and the nature of the metal compound. At times, the materials may be merely mixed without pH adjustment.

It is preferred that the bacitracin solution which is mixed with the metal compound be at a pH in the range of about 2.5 to 8, further preferably about 4.5 to 6. The solution is desirably a bacitracin fermentation product, for simplicity and economy, such as the fermentation liquor and concentrates thereof. The several fermentation products are obtained at pH values in the range of about 3 to 7. Alternatively, purer forms of bacitracin may be employed.

When pH adjustment is made, it is lowered preferably with one of the acids, sulfuric, hydrochloric, and sodium acid sulfate. The pH is raised preferably with sodium hydroxide or the like.

Bacitracin fermentation liquors are conveniently concentrated by evaporation of water for ease in processing, to a soluble solids content of about 30% to 40% by weight, and the examples herein refer to such concentrates. Insoluble products are preferably removed by filtration prior to concentration, but they may be allowed to remain if desired.

The metal compound is admixed with bacitracin in an amount sufficient to increase the bacitracin stability. The preferred proportion is about 0.2 gram to 5 grams of the metal per gram of bacitracin, on the basis of 42,000 bacitracin units per gram by the standard cup-plate assay method and standardizing with the Food and Drug Administration Official Master Standard. There appears to be no advantage in employing a larger quantity, and the results indicate that about 1–2 grams of metal per gram of bacitracin activity is adequate for optimum stability.

It is preferred to concentrate the aqueous mixtures prepared in the foregoing manner, such as by evaporation of water therefrom to produce a dry composition. The material is dried in a conventional manner, for example, by rotary drum drying, lyophilization, spray drying, and the like.

A significant result of the invention is that the bacitracin in the stabilized composition is present in a readily available form. This may be demonstrated by the extraction tchnique employed in the standard FDA assay method. When the composition is extracted with 1% pH 6 phosphate buffer according to this method, the expected content or potency of bacitracin is obtained in the assay. In contrast, commercially available insoluble zinc bacitracin prepared according to U.S. Patent 2,809,892 exhibits only about one-half of the expected potency by the standard assay, and a special extraction procedure is required for obtaining a determination of the complete bacitracin content, the extraction requiring 0.2 normal hydrochloric acid addition followed by extraction with 22% pyridine and 1% pH 6 phosphate buffer solution.

The stabilized bacitracin composition may be employed directly as an animal feed additive, for nutritional and therapeutic purposes. It is ordinarily preferred to standardize the antibiotic content of the composition by admixing an edible diluent. It is further preferred to incorporate nutrient animal feedstuff diluents to provide a feed supplement containing the bacitracin as a growth-promoting factor, and such diluents may include soya products, starch, fish meal, distillery by-products, brewery by-products, sugars, minerals and the like, as well as vitamins such as vitamin $B_{12}$, amino acids, and other growth-promoting factors. The feed additive may contain the stabilized composition in a preferred proportion of about 1 to 100 grams of bacitracin per pound of the mixture. The additive may be mixed with the feed by the livestock grower or by a feed supplier, at a level in the range of about 1 to 200 grams of bacitracin per ton of feed. The compositions may be incorporated in the diet of non-ruminants such as poultry and swine, and are especially desirable in poultry husbandry.

The following examples illustrate the highly enhanced stability of the bacitracin compositions and their effectiveness. The compositions are stable for long periods of time under normally adverse conditions, and the tests show high stability even under strenuous conditions. The bacitracin starting materials employed were produced by fermenting an aqueous nutrient medium with a bacitracin-producing strain of *Bacillus subtilis*, by submerged agitated and aerated fermentation, as described in U.S. Patent 2,813,061, followed by conventional filtration to remove suspended solids including cellular debris, and concentration by evaporation in vacuo to about 30 to 40% solids. The bacitracin assays were conducted according to the FDA standard method, employing 1% pH 6 phosphate buffer according to this method, and where indicated, also by the special assay extraction procedure employing 0.2 N hydrochloric acid and 22% pyridine–1% pH 6 phosphate buffer. The examples are illustrative of methods and compositions according to the invention. It is to be understood that the invention is not limited to the examples or to the materials, proportions, conditions and procedures set forth therein.

EXAMPLE 1

Two pound aliquots of concentrated bacitracin filtrate (pH 6.1, 34.2% dried solids, 3400 bacitracin units/gram) were adjusted to pH 5 with 2.5 N HCl. Feed grade zinc oxide (ZZZ–55 feed grade, 99.2% pure, American Zinc Company, Columbus, Ohio), was added in the amounts indicated below in Table I. The mixtures were agitated for 30 minutes and then dried (without further pH adjustment) on a vacuum rotary dryer (29 inches vacuum, 20 lbs. per sq. inch steam pressure). The dried products were compared for heat stability after storage for 37 weeks at the temperatures indicated. The retention of activity in each case was excellent.

*Table I*

| ZnO, gms. per 2 lbs. concentrate | pH after agitation | Gms. of Zn per gm. of bacitracin activity | Dried solid activity, u./gm. | Storage temp., °C. | Activity after 37 weeks u./gm. |
|---|---|---|---|---|---|
| 91 | 6.2 | 1.0 | 6,360 | 5 | 6,960 |
|  |  |  |  | 37 | 6,600 |
| 182 | 6.4 | 2.0 | 4,900 | 5 | 4,800 |
|  |  |  |  | 37 | 4,850 |

EXAMPLE 2

100 gram aliquots of concentrated bacitracin filtrate (pH 6.4, 34.1% dry solids, 3180 bacitracin units/gram of the concentrate) were mixed with insoluble analytical reagent (AR) grade zinc compounds (1 gram zinc per gram of bacitracin activity) in the amounts indicated below in Table II. The mixtures were adjusted to pH 6.4 with 6 N $H_2SO_4$ and then dried on a vacuum rotary dryer (27 inches vacuum, 20 lbs. per sq. inch steam pressure). The dried samples were compared for heat stability after being maintained at 106–108° C. for 22 hours.

*Table II*

| Compound added | Dried solid, bacitracin activity, units per gram | Per cent activity remaining after 22 hours at 106°–108° C. |
|---|---|---|
| None | 9,600 | 3 |
| 9.45 gm. ZnO | 7,490 | 54 |
| 11.5 gm. Zn(OH)₂ | 6,370 | 70 |

EXAMPLE 3

100 gram aliquots of concentrated bacitracin filtrate (pH 6.4, 34.2% dry solids, 3200 bacitracin units/gm.) were mixed with various compounds (1 gram metal per gram of bacitracin activity) in the amounts indicated below in Table III. The CdO-bacitracin concentrate mixture rose in pH to 9.0 and was readjusted to 7 with 6 N $H_2SO_4$ prior to drying. The $BaO_2$-bacitracin concentrate mixture rose in pH to 9.5 and was readjusted to 7 with 6 N $H_2SO_4$ prior to drying. The HgO-bacitracin concentrate mixture rose in pH to 7.5 and was not readjusted prior to drying. The other bacitracin concentrate mixtures were essentially unchanged in pH. The mixtures were then dried on a vacuum rotary dryer (27 inches vacuum, 20 lbs. per sq. inch steam pressure). The dried samples were compared for heat stability after being maintained at 106–108° C. for 22 hours.

*Table III*

| Compound added | Dried solid, bacitracin activity, units per gram | Per cent activity remaining after 22 hours at 106°–108° C. |
|---|---|---|
| None | 10,640 | 1.6 |
| 12.7 gm. TiO₂ | 7,700 | 3.6 |
| 8.7 gm. CdO | 7,560 | 59 |
| 10.9 gm. Fe₂O₃ | 8,050 | <1.2 |
| 9.5 gm. BaO₂ | 4,620 | 2.4 |
| 8.55 gm. CuO | 6,230 | <1 |
| 11.5 gm. MoO₃(85%) | 6,580 | 17.3 |
| 8.2 gm. HgO | 4,130 | <1 |
| 14.7 gm. Al₂O₃ | 7,280 | 1.5 |

EXAMPLE 4

100 gram aliquots of concentrated bacitracin filtrate, 2000 bacitracin units per gram, pH 6.8 were adjusted to the pH levels indicated below in Table IV with 6 N $H_2SO_4$ and dried on a vacuum rotary dryer (27 inches vacuum, 20 lbs. per sq. inch steam pressure). A second set of aliquots of bacitracin concentrate were treated in a similar fashion except that 5.95 grams of zinc oxide (AR grade, 1 gram zinc per gram bacitracin activity) were added to each concentrate sample after pH adjustment and prior to drying. A third set of dried products was prepared by dry blending samples of the dried bacitracin solids obtained from 100 gram aliquots (prepared without zinc oxide) with zinc oxide (1 gram zinc per gram bacitracin activity). These samples were compared for heat stability after 22 hours at 102°–106° C.

*Table IV*

| Conditions | Bacitracin concentrate pH adjustment | Dried solid, bacitracin activity, units per gram | Percent activity remaining after 22 hrs. at 102°–106° C. |
| --- | --- | --- | --- |
| No zinc oxide added | 4.5 | 6,000 | 13 |
|  | 5.0 | 6,000 | 13.5 |
|  | 5.5 | 6,100 | 17.4 |
|  | 6.0 | 6,600 | 13 |
|  | 6.5 | 6,450 | 15 |
| Zinc oxide added prior to drying | 4.5 | 5,350 | 42 |
|  | 5.0 | 5,450 | 68 |
|  | 5.5 | 5,450 | 62 |
|  | 6.0 | 4,550 | 66 |
|  | 6.5 | 5,200 | 57 |
| Zinc oxide blended with dried bacitracin solid | 4.5 | 4,500 | 35 |
|  | 5.0 | 5,150 | 37 |
|  | 5.5 | 5,150 | 50 |
|  | 6.0 | 5,600 | 34 |
|  | 6.5 | 4,800 | 34 |

EXAMPLE 5

The pH 6 bacitracin solids from Example 4 were analyzed using two different methods of sample preparation. In the first method (FDA), 2 grams of sample were added to 200 ml. of 1% pH 6 phosphate buffer and the mixture macerated for 3 hours with occasional shaking. The mixture was then centrifuged and an aliquot of the supernatant diluted for assay with 1% pH 6 phosphate buffer.

In the second method, 4 grams of sample were added to 10 ml. of 0.2 N HCl and the mixture stirred for 2 minutes. 90 ml. of 22% pyridine-pH 6 1% phosphate buffer solution were then added and the mixture stirred for 15 minutes. The mixture was then centrifuged and an aliquot of the supernatant diluted for assay with 1% pH 6 phosphate buffer.

For comparative purposes, a sample of commercially available insoluble zinc bacitracin feed supplement having an activity rating of 925 units per gram (U.S. Patent 2,809,892) was analyzed using both of the above methods of sample preparation. The assay data are shown in the following Table V.

*Table V*

| Samples | Method of assay sample preparation — Bacitracin activity, units per gram | |
| --- | --- | --- |
|  | Phosphate buffer | HCl-pyridine-buffer |
| Dried bacitracin composition, no zinc oxide added | 6,405 | 5,964 |
| Dried zinc oxide-bacitracin composition, zinc oxide added prior to drying | 5,100 | 5,175 |
| Dried zinc oxide-bacitracin composition, zinc oxide added after drying | 5,304 | 5,326 |
| Commercially available insoluble zinc bacitracin feed supplement (925 u./gm.) | 495 | 906 |

EXAMPLE 6

In order to compare the effect of pH prior to drying, 100 gram aliquots of concentrated bacitracin filtrate (pH 6.9, 2500 bacitracin units per gram) were adjusted to the pH levels indicated below in Table VI. 7.55 grams of zinc oxide (AR grade, 1 gram zinc per gram bacitracin activity) were added to each sample and then, after stirring, each mixture was adjusted with 6 N $H_2SO_4$ or 5% NaOH to the original adjusted pH level. The zinc oxide-bacitracin mixtures were then dried on a vacuum rotary drum dryer (27 inches vacuum, 20 lbs. per sq. inch steam pressure). The dried samples were compared for heat stability after 22 hours at 102°–106° C.

*Table VI*

| Adjusted pH level | Dried solid, bacitracin activity, units per gram | Percent activity remaining after 22 hours at 102°–106° C. |
| --- | --- | --- |
| Control, no zinc oxide (pH 6.9) | 7,630 | 6.4 |
| 2.5 | 3,805 | 16.0 |
| 3.5 | 3,225 | 42.8 |
| 4.5 | 4,560 | 88.2 |
| 5.5 | 4,920 | 85.4 |
| 6.5 | 5,160 | 86.6 |
| 7.5 | 5,340 | 80.9 |
| 8.0 | 6,170 | 73.5 |

EXAMPLE 7

The pH 2.5, 3.5 and 8.0 dried zinc oxide-bacitracin compositions obtained in Example 6 were comparatively assayed using the two assay extraction procedures described in Example 5. The assay data are shown in the following Table VII.

*Table VII*

| Sample | Method of assay sample preparation — Bacitracin activity, units per gram | |
| --- | --- | --- |
|  | Phosphate buffer | HCl-pyridine-buffer |
| pH 2.5 dried zinc oxide-bacitracin composition | 4,050 | 3,750 |
| pH 3.5 dried zinc oxide-bacitracin composition | 3,650 | 3,600 |
| pH 8 dried zinc oxide-bacitracin composition | 6,700 | 6,050 |

EXAMPLE 8

150 gram aliquots of concentrated bacitracin filtrate (pH 5.4, 33.2% dry solids, 3330 bacitracin units per gram) were mixed with zinc oxide (AR grade) in the amounts indicated below in Table VIII. The zinc oxide-bacitracin mixtures were adjusted to pH 5 with 6 N $H_2SO_4$ and then dried on a vacuum rotary dryer (28 inches vacuum, 20 lbs. per sq. inch steam pressure). The dried samples were compared for stability after treatment at 103° C. and 96% relative humidity for 2.5 hours.

*Table VIII*

| Zinc oxide, gm., added per 150 gm. bacitracin concentrate | Ratio of zinc per gram of bacitracin activity | Direct solid bacitracin activity units per gram | Percent activity remaining after 2.5 hrs. at 103 °C. and 96% relative humidity |
| --- | --- | --- | --- |
| 0.0 | 0.0 | 8,900 | 3.2 |
| 3.7 | 0.25 | 8,240 | 10.1 |
| 7.4 | 0.5 | 8,480 | 11.9 |
| 14.8 | 1.0 | 6,120 | 23.7 |
| 22.2 | 1.5 | 5,340 | 25.7 |
| 29.6 | 2.0 | 5,280 | 29.0 |
| 44.4 | 3.0 | 3,840 | 29.7 |
| 59.2 | 4.0 | 3,270 | 20.8 |
| 74.0 | 5.0 | 2,790 | 22.6 |

EXAMPLE 9

300 gram aliquots of concentrated bacitracin filtrate (pH 5.4, 34.0% solids, 3400 bacitracin units per gram) were mixed with 60.8 grams of zinc oxide (AR grade, 2 grams zinc per gram bacitracin activity). The several quantities of 6 N $H_2SO_4$ (calculated as ml. 6 N $H_2SO_4$ per gram ZnO) indicated in Table IX were added. After 30 minute agitation, the mixtures were dried on a vacuum rotary dryer (28 inches vacuum, 20 lbs. per sq. inch steam pressure). The dried samples were compared for stability after treatment at 103° C. and 96% relative humidity for 2 hours.

*Table IX*

| ml. 6 N H$_2$SO$_4$ per gram ZnO | Mixture pH | Dried solid, bacitracin activity, units per gram | Percent activity remaining after 2 hrs. at 103° C. and 96% relative humidity |
|---|---|---|---|
| 0.99 | 5.2 | 5,100 | 43.8 |
| 1.36 | 5.5 | 4,800 | 55.3 |
| 1.70 | 5.5 | 4,600 | 55.2 |
| 2.04 | 5.4 | 4,525 | 52.9 |
| 2.37 | 5.4 | 3,775 | 46.8 |
| 2.72 | 5.3 | 4,000 | 41.2 |

EXAMPLE 10

300 gram aliquots of concentrated bacitracin filtrate (pH 5.4, 34.0% solids, 3400 bacitracin units per gram) were mixed with 60.8 grams of AR or feed grade (ZZZ-55), zinc oxide (2 grams zinc per gram bacitracin activity). The quantities of 6 N H$_2$SO$_4$ indicated below in Table X were added and the mixtures, after 30 minutes agitation, dried on a vacuum rotary dryer (28 inches vacuum, 20 lbs. per sq. inch steam pressure). The dried samples were compared for stability after treatment at 103° C. and 96% relative humidity for 2 hours.

*Table X*

| Zinc oxide grade | ml. 6 N H$_2$SO$_4$ per gram ZnO | Mixture, pH | Dried solid, bacitracin activity, units/gram | Percent activity remaining after 2 hours at 103° C. and 96% relative humidity |
|---|---|---|---|---|
| Analytical reagent (AR) | 0.99 | 5.4 | 4,750 | 42.8 |
|  | 1.36 | 5.6 | 4,475 | 49.4 |
|  | 1.70 | 5.5 | 4,325 | 51.8 |
|  | 2.04 | 5.4 | 4,375 | 48.9 |
| Feed grade (ZZZ-55) | 0.99 | 5.4 | 4,650 | 43.4 |
|  | 1.36 | 5.6 | 4,725 | 51.8 |
|  | 1.70 | 5.5 | 4,300 | 56.9 |
|  | 2.04 | 5.3 | 3,925 | 51.7 |

EXAMPLE 11

100 pounds of concentrated bacitracin filtrate (pH 5.4, 33.9% solids, 3100 bacitracin units per gram) were mixed with 8400 grams zinc oxide (ZZZ-55 feed grade, 2 grams zinc per gram bacitracin activity). 6 N H$_2$SO$_4$ (11,424 mls., 1.36 ml. per gram zinc oxide) were added slowly with agitation, over a 30-minute period. The resulting mixture weighed 149 pounds and contained 40.4% dry solids. The expected bacitracin activity was 5150 units per gram of dried mixture (solids), calculated from the activity of the initial concentrate.

A portion of the zinc oxide-bacitracin concentrate mixture was held without agitation at room temperature and aliquots dried on a vacuum rotary dryer (28 inches vacuum, 20 lbs. per sq. inch steam pressure) after 2 and 4 hours. The remainder of the zinc oxide-bacitracin concentrate mixture was agitated at room temperature as indicated below in Table XI and samples dried on a vacuum rotary dryer (28 inches vacuum, 20 lbs. per sq. inch steam pressure) after 2, 4, and 20 hours. The dried samples were assayed by the FDA method and found to correspond to the expected activity within the limits of the assay. The dried samples were compared in the same manner for stability after treatment at 103° C. and 96% relative humidity for 2 hours.

*Table XI*

| Mixture dried after | Mixture, pH | Dried solid, bacitracin activity, units per gram | Percent activity remaining after 2 hours at 103° C. and 96% relative humidity |
|---|---|---|---|
| 0 hours | 5.1 | 5,150 | 62.6 |
| 2 hours, no agitation | 5.3 | 4,550 | 61.2 |
| 4 hours, no agitation | 5.1 | 4,925 | 63.4 |
| 2 hours, agitation | 5.1 | 5,000 | 57.0 |
| 4 hours, agitation | 5.1 | 5,175 | 61.7 |
| 4 hours agitation+16 hours, no agitation | 5.9 | 4,650 | 57.5 |

EXAMPLE 12

A chick feeding trial was conducted wherein day-old sexed, male New Hampshire chicks were divided into groups of 20 chicks. One group received the otherwise nutritionally adequate predominantly vegetable basal chick ration shown in Table XII. Two groups received the basal ration supplemented with two levels of a commercial bacitracin supplement (Pabst bacitracin supplement—"Bio-Pabst"). Two groups received the basal ration supplemented with equivalent amounts of dried zinc oxide-bacitracin supplement (2 grams zinc per gram bacitracin activity) prepared in the manner described in the first paragraph of Example 11. Two groups received the basal ration supplemented with procaine penicillin and oleandomycin, respectively. The data obtained at the end of 4 and 8 weeks are given in Table XIII.

*Table XII*

BASAL CHICK RATION

| Ingredient: | | Amount |
|---|---|---|
| Ground yellow corn | lbs. per 100 lbs | 43.0 |
| Soybean oil meal (44%) | do | 32.5 |
| Wheat bran | do | 5.0 |
| Wheat middlings | do | 5.0 |
| Dehydrated alfalfa meal (17%) | do | 5.0 |
| Steamed bone meal | do | 2.0 |
| Ground limestone | do | 2.0 |
| Granite grit | do | 2.0 |
| Salt | do | 0.5 |
| Fish meal | do | 3.0 |
| MnSO$_4$ | gms./100 lbs | 15 |
| Riboflavin | mg./lb | 0.5 |
| Vitamin D-3 | units/lb | 133 |
| Vitamin A | do | 2000 |
| Choline | gm./lb | 0.12 |
| Vitamin B$_{12}$ | mcg./lb | 13.6 |

*Table XIII*

| Supplement added | Equivalent antibiotic activity, gms. per ton feed | Average, 4 Weeks | Chick weights, gms., 8 Weeks | Average feed efficiency, 8 Weeks |
|---|---|---|---|---|
| None | | 286 | 842 | 3.13 |
| Bacitracin supplement | 10 | 329 | 933 | 2.92 |
| Bacitracin supplement | 100 | 317 | 877 | 2.86 |
| Zinc oxide-bacitracin supplement | 10 | 330 | 901 | 2.69 |
| Zinc oxide-bacitracin supplement | 100 | 344 | 916 | 2.78 |
| Procaine penicillin | 10 | 293 | 892 | 2.88 |
| Oleandomycin | 10 | 308 | 926 | 3.11 |

The invention thus provides bacitracin compositions of enhanced stability which are especially useful in compositions and methods employed for nutritional and therapeutic purposes in animal husbandry. The antibiotic is stabilized in a very simple and effective manner which is well suited for large scale production, especially due to its simplicity and economy. The antibiotic in the compositions is readily available and completely effective in use.

The invention is hereby claimed as follows:

1. An antibiotic composition of enhanced stability and comprising the antibiotic bacitracin in admixture with a water-insoluble compound of a metal selected from the group consisting of zinc and cadmium which is not a compound of bacitracin.

2. An antibiotic composition of enhanced stability and comprising the antibiotic bacitracin in admixture with zinc oxide.

3. An antibiotic composition of enhanced stability and comprising the antibiotic bacitracin in admixture with cadmium oxide.

4. An antibiotic composition of enhanced stability and comprising the antibiotic bacitracin in admixture with zinc oxide in a proportion of about 0.2 gram to 5 grams of zinc per gram of bacitracin.

5. An antibiotic animal feed additive of enhanced stability and comprising the antibiotic bacitracin in admixture with zinc oxide, and an edible diluent for the mixture.

6. An antibiotic animal feed supplement of enhanced stability and comprising the antibiotic bacitracin in admixture with zinc oxide, and a nutrient poultry feedstuff diluent for the mixture.

7. An animal feedstuff containing an antibiotic feed additive as a nutritional and therapeutic ingredient, said antibiotic feed additive having enhanced stability and comprising the antibiotic bacitracin in admixture with zinc oxide, said additive being present in a proportion providing about 1 gram to 200 grams of bacitracin per ton of feedstuff.

8. The method of controllably administering an antibiotic to poultry which comprises administering to the poultry the antibiotic bacitracin stabilized by zinc oxide in admixture therewith.

9. The method of preserving the activity of the antibiotic bacitracin which comprises providing in intimate admixture therewith, a water-insoluble compound of a metal selected from the group consisting of zinc and cadmium which is not a compound of bacitracin.

10. The method of producing an antibiotic composition of enhanced stability which comprises mixing an aqueous solution of bacitracin with zinc oxide, providing a pH in the resulting mixture in the range of about 3.5 to 8, and drying the mixture.

11. The method of producing an antibiotic animal feed additive of enhanced stability which comprises mixing bacitracin fermentation liquor with zinc oxide, providing a pH in the resulting mixture in the range of about 3.5 to 8, and drying the mixture.

12. An antibiotic animal feed additive of enhanced stability and comprising an intimate mixture of bacitracin and zinc oxide obtained by mixing bacitracin fermentation liquor with zinc oxide, providing a pH in the resulting mixture in the range of about 3.5 to 8, and drying the mixture.

References Cited in the file of this patent

UNITED STATES PATENTS

| | | |
|---|---|---|
| 2,774,712 | Baron | Dec. 18, 1956 |
| 2,803,584 | Hodge et al. | Aug. 20, 1957 |
| 2,809,892 | Chornock | Oct. 15, 1957 |
| 2,906,622 | Lewis | Sept. 29, 1959 |

OTHER REFERENCES

Dorland: "The American Illustrated Medical Dictionary," 21st ed., 1947, W. B. Saunders Co., Philadelphia, Pa., p. 225, Col. 1 (Cadmium, Toxicity Uses: Antiseptic).

UNITED STATES PATENT OFFICE
CERTIFICATE OF CORRECTION

Patent No. 3,025,216  
March 13, 1962

Jack Ziffer et al.

It is hereby certified that error appears in the above numbered patent requiring correction and that the said Letters Patent should read as corrected below.

Column 2, line 22, after "mixing" insert -- with --; column 3, line 8, for "tchnique" read -- technique --; column 6, Table VIII, in the heading to colum 3, line 1 thereof, for "Direct" read -- Dried --; column 10, line 36, for "225" read -- 255 --.

Signed and sealed this 9th day of October 1962.

(SEAL)  
Attest:

ERNEST W. SWIDER  
Attesting Officer

DAVID L. LADD  
Commissioner of Patent